(12) United States Patent
Beaulieu

(10) Patent No.: US 10,372,162 B1
(45) Date of Patent: Aug. 6, 2019

(54) TOMBSTONE DISPLAY ASSEMBLY

(71) Applicant: Jeffery Beaulieu, Rochester, NH (US)

(72) Inventor: Jeffery Beaulieu, Rochester, NH (US)

( * ) Notice: Subject to any disclaimer, the term of this patent is extended or adjusted under 35 U.S.C. 154(b) by 0 days.

(21) Appl. No.: 16/114,911

(22) Filed: Aug. 28, 2018

(51) Int. Cl.
    *E04H 13/00*      (2006.01)
    *G06F 1/16*      (2006.01)

(52) U.S. Cl.
    CPC ......... *G06F 1/1637* (2013.01); *E04H 13/003* (2013.01); *G06F 1/1656* (2013.01)

(58) Field of Classification Search
    CPC .... G06F 1/1637; G06F 1/1656; E04H 13/003
    See application file for complete search history.

(56) References Cited

U.S. PATENT DOCUMENTS

| | | | | |
|---|---|---|---|---|
| 4,202,144 | A * | 5/1980 | Patterson | E04H 13/003 52/103 |
| 5,404,343 | A * | 4/1995 | Boggio | E04H 13/003 360/12 |
| 5,622,014 | A * | 4/1997 | Weiss | A61G 17/08 52/105 |
| 5,732,515 | A * | 3/1998 | Rodrigues | E04H 13/003 312/102 |
| 5,822,895 | A * | 10/1998 | Risdal | B44F 1/04 40/124.5 |
| 5,987,720 | A * | 11/1999 | Yamamoto | A01N 1/00 27/1 |
| 6,094,871 | A * | 8/2000 | Arnold | E04H 13/003 40/124.5 |
| 6,132,054 | A * | 10/2000 | Rogers | E04H 13/003 362/145 |
| 6,414,663 | B1 * | 7/2002 | Manross, Jr. | A61G 17/08 345/87 |
| 6,557,222 | B2 * | 5/2003 | Groemminger | A61G 17/04 27/10 |
| 6,980,107 | B1 * | 12/2005 | Ziegler | E04H 13/003 340/540 |
| 7,089,495 | B2 | 8/2006 | Barrows | |
| 7,373,703 | B1 * | 5/2008 | Grenci | A61G 17/08 27/1 |
| 7,609,506 | B2 | 10/2009 | Aguirre | |
| 7,716,878 | B1 * | 5/2010 | Altman | E04H 13/003 40/124.5 |

(Continued)

FOREIGN PATENT DOCUMENTS

WO    WO2004040547    5/2004

*Primary Examiner* — Binh B Tran
*Assistant Examiner* — Douglas R Burtner

(57) ABSTRACT

A tombstone display assembly includes a tombstone for a deceased person and a housing that is coupled to the tombstone such that the housing is visible to individuals visiting the tombstone. A plurality of religious symbols is provided and a selected one of the religious symbols is removably attached to the housing. The selected religious symbol is chosen according to religious beliefs of the deceased person. A pair of adhesive strips is each coupled to the housing and each of the adhesive strips adhesively engages the tombstone to retain the housing on the tombstone. A display is coupled to the housing and the display is electrically coupled to the control circuit. The display displays indicia comprising images and text that are associated with the deceased person. In this way the display enhances the memorial experience for the individuals visiting the tombstone.

7 Claims, 5 Drawing Sheets

(56) References Cited

U.S. PATENT DOCUMENTS

| | | | | |
|---|---|---|---|---|
| 8,068,035 B1* | 11/2011 | Salcedo | E04H 13/003 | 320/101 |
| D669,075 S | 10/2012 | Seo | | |
| 9,132,054 B2* | 9/2015 | Rojdev | A61G 17/04 | |
| 9,350,425 B1* | 5/2016 | Lewis | H04B 5/0068 | |
| 9,580,927 B1* | 2/2017 | Heil | F16M 13/022 | |
| 9,610,207 B1* | 4/2017 | Fort | A61G 17/08 | |
| 2001/0036354 A1* | 11/2001 | Majors | E04H 13/003 | 386/231 |
| 2003/0145533 A1* | 8/2003 | Dudek | E04H 13/00 | 52/128 |
| 2003/0217120 A1* | 11/2003 | Hickey | H04L 29/06 | 709/219 |
| 2004/0085337 A1* | 5/2004 | Barrows | E04H 13/003 | 715/717 |
| 2004/0159031 A1* | 8/2004 | Chang | A47G 1/0616 | 40/800 |
| 2005/0268235 A1* | 12/2005 | Stone | E04H 13/003 | 715/716 |
| 2006/0236326 A1* | 10/2006 | Aguirre | G06F 1/1626 | 719/322 |
| 2008/0078074 A1* | 4/2008 | McCampbell | E04H 13/006 | 27/1 |
| 2008/0116772 A1* | 5/2008 | Champagne | A47F 3/005 | 312/117 |
| 2010/0008076 A1* | 1/2010 | Elam | E04H 13/003 | 362/183 |
| 2010/0012606 A1* | 1/2010 | Bourgo | A61G 17/08 | 211/85.27 |
| 2010/0077577 A1* | 4/2010 | Rojdev | A61G 17/04 | 27/1 |
| 2010/0158478 A1* | 6/2010 | Gomez, Jr. | E04H 13/003 | 386/291 |
| 2010/0205872 A1* | 8/2010 | Leyden | E04H 13/003 | 52/103 |
| 2010/0299895 A1* | 12/2010 | Burlage | A61G 17/04 | 27/14 |
| 2010/0307037 A1* | 12/2010 | Chi | E04H 13/003 | 40/124.5 |
| 2011/0078882 A1* | 4/2011 | Wessel | A47G 1/12 | 27/1 |
| 2011/0308118 A1* | 12/2011 | Gorham, Jr. | E04H 13/003 | 40/124.5 |
| 2013/0021002 A1* | 1/2013 | Mayes | H02J 7/32 | 320/137 |
| 2013/0276337 A1* | 10/2013 | Gorham, Jr. | A47G 1/0616 | 40/124.5 |
| 2014/0182096 A1* | 7/2014 | Jairala, Jr. | A61G 17/08 | 27/1 |
| 2015/0252583 A1* | 9/2015 | Dvorak | E04H 13/006 | 52/103 |
| 2016/0002948 A1* | 1/2016 | Galarza | E04H 13/003 | 386/230 |
| 2016/0378245 A1* | 12/2016 | Montgomery | G06F 3/1423 | 345/173 |
| 2017/0041584 A1* | 2/2017 | Jones | G06K 7/1413 | |
| 2018/0035094 A1* | 2/2018 | Evans | G06F 1/3231 | |
| 2018/0329946 A1* | 11/2018 | Gbur | G06K 19/06037 | |

* cited by examiner

TOMBSTONE DISPLAY ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to display devices and more particularly pertains to a new display device for PURPOSE.

BRIEF SUMMARY OF THE INVENTION

An embodiment of the disclosure meets the needs presented above by generally comprising a tombstone for a deceased person and a housing that is coupled to the tombstone such that the housing is visible to individuals visiting the tombstone. A plurality of religious symbols is provided and a selected one of the religious symbols is removably attached to the housing. The selected religious symbol is chosen according to religious beliefs of the deceased person. A pair of adhesive strips is each coupled to the housing and each of the adhesive strips adhesively engages the tombstone to retain the housing on the tombstone. A display is coupled to the housing and the display is electrically coupled to the control circuit. The display displays indicia comprising images and text that are associated with the deceased person. In this way the display enhances the memorial experience for the individuals visiting the tombstone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
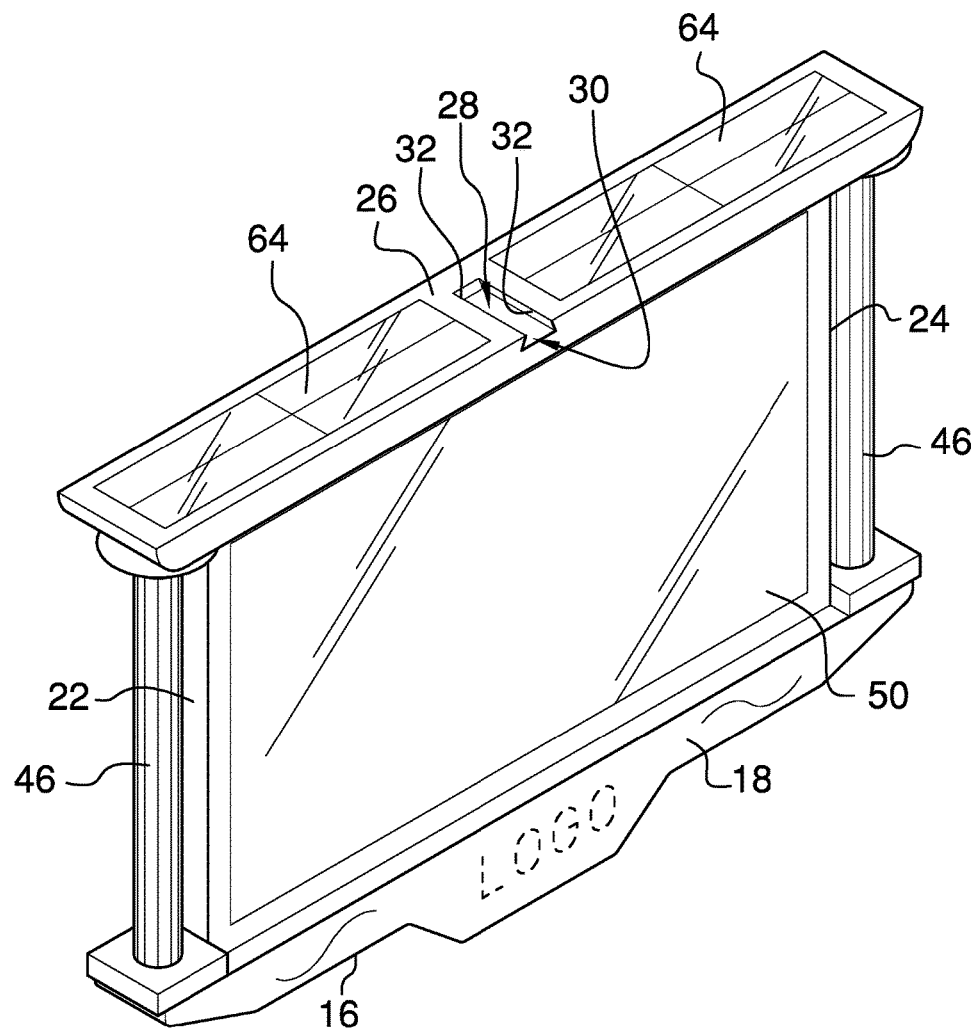
FIG. 1 is a front perspective view of a tombstone display assembly according to an embodiment of the disclosure.
Figure 2:
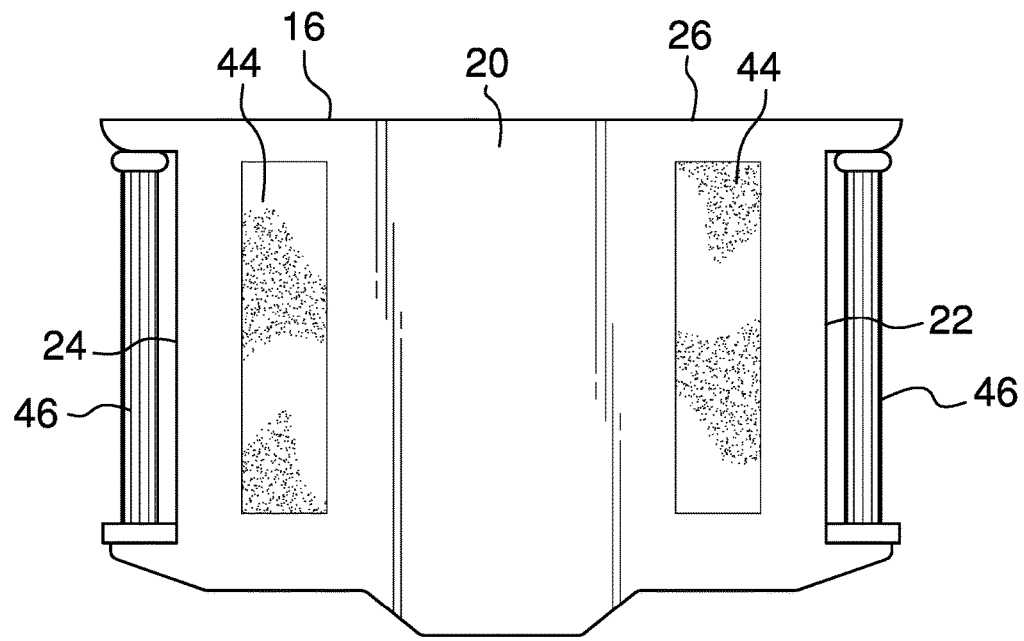
FIG. 2 is a back view of an embodiment of the disclosure.
Figure 3:
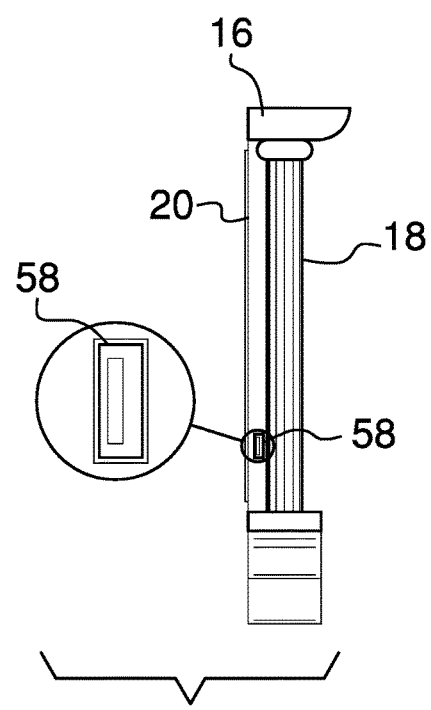
FIG. 3 is a right side view of an embodiment of the disclosure.
Figure 4:
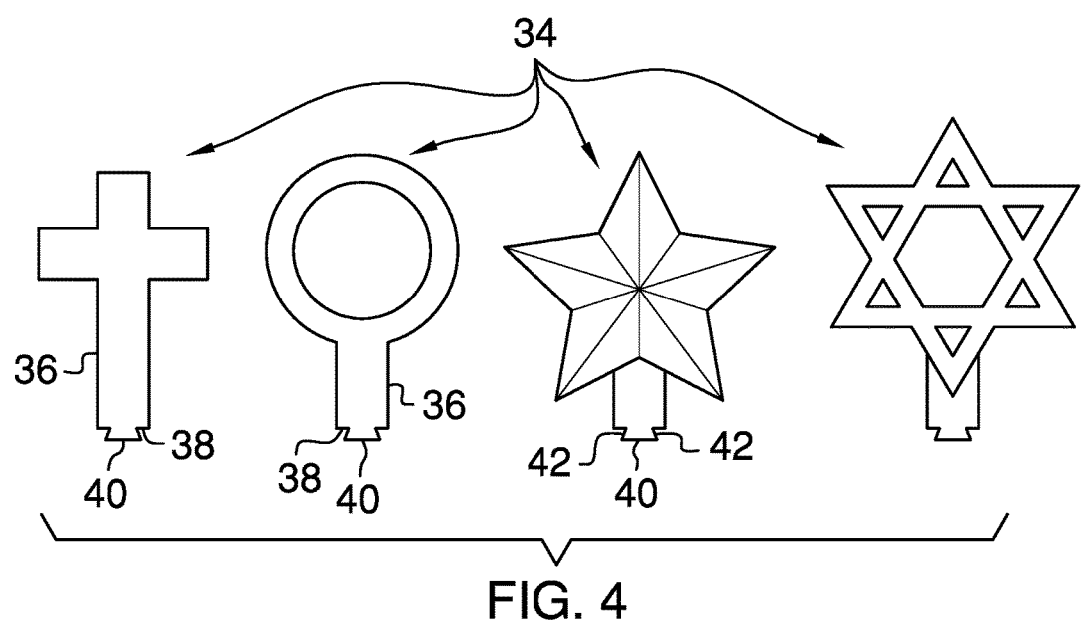
FIG. 4 is a perspective view of a plurality of religious symbols of an embodiment of the disclosure.
Figure 5:
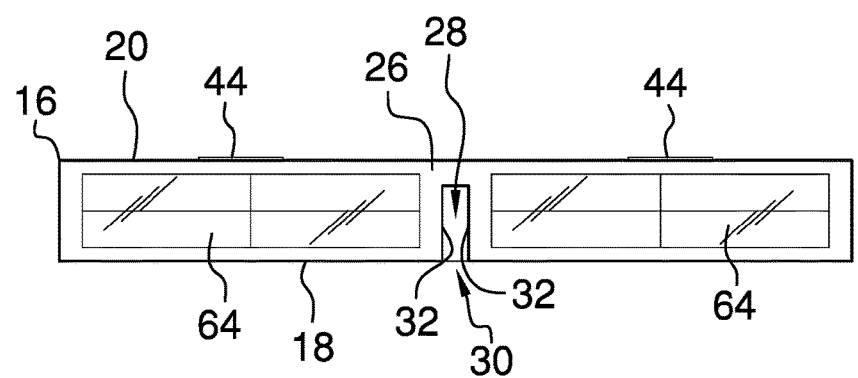
FIG. 5 is a top view of an embodiment of the disclosure.
Figure 6:
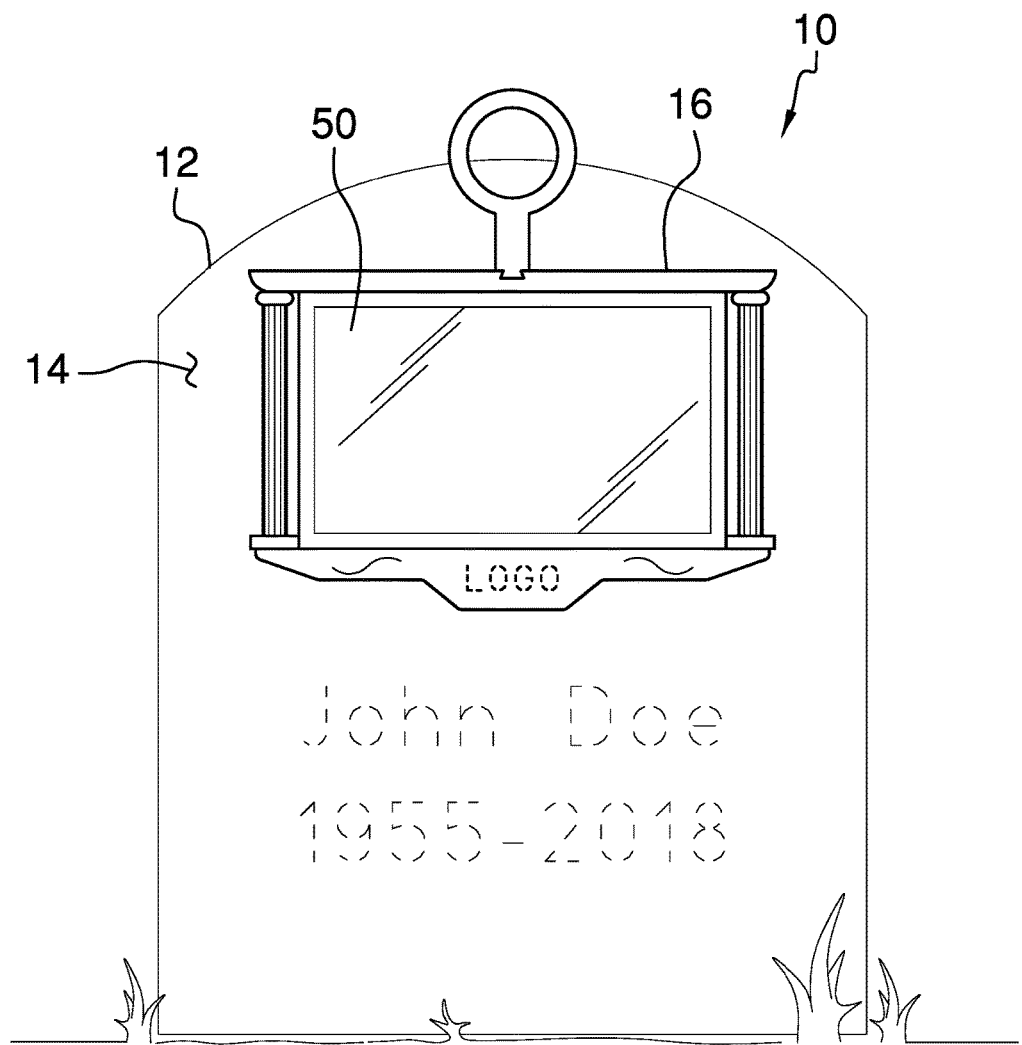
FIG. 6 is a perspective in-use view of an embodiment of the disclosure.
Figure 7:
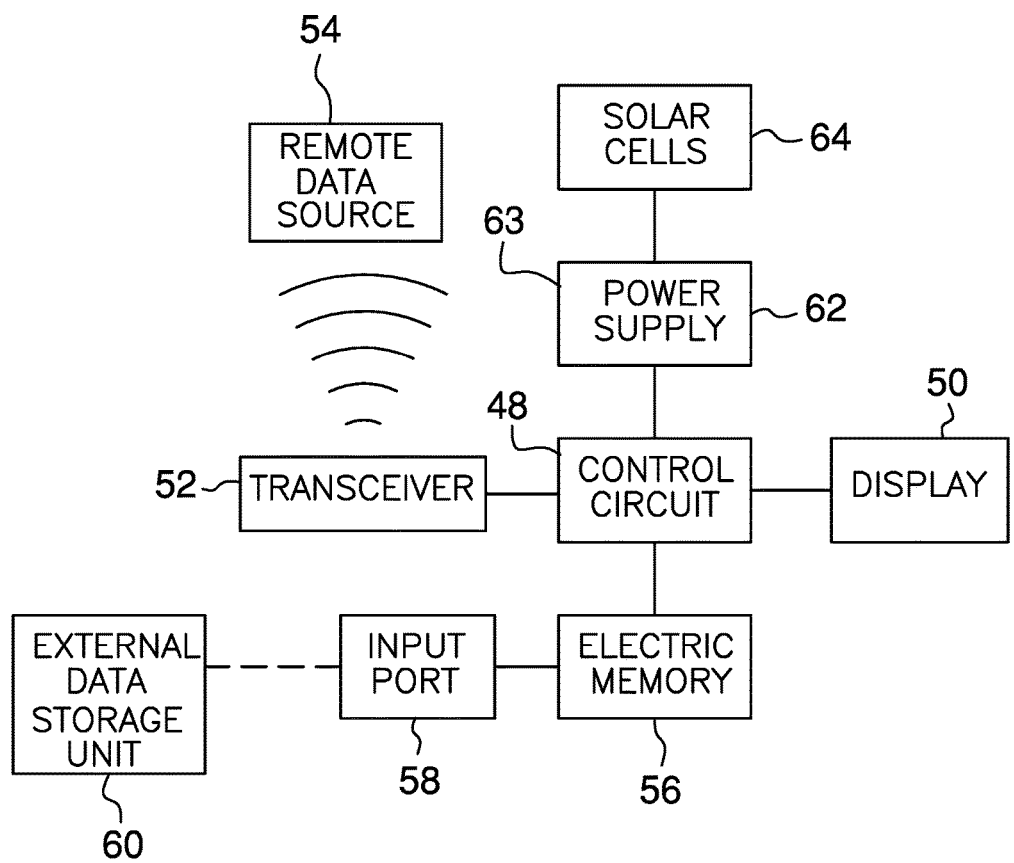
FIG. 7 is a schematic view of an embodiment of the disclosure.

With reference now to the drawings, and in particular to FIGS. 1 through 7 thereof, a new display device embodying the principles and concepts of an embodiment of the disclosure and generally designated by the reference numeral 10 will be described.

As best illustrated in FIGS. 1 through 7, the tombstone display assembly generally comprises a tombstone 12 for a deceased person and the tombstone 12 has a front face 14. The tombstone 12 may be a tombstone of any conventional design such as is commonly displayed in a cemetery. A housing 16 is provided and the housing 16 is coupled to the tombstone 12. Moreover, the housing 16 is positioned on the front face 14 such that the housing 16 is visible to individuals visiting the tombstone 12.

The housing 16 has a front wall 18, a back wall 20, a first lateral side 22, a second lateral side 24 and a top side 26. The top side 26 has a slot 28 extending downwardly therein and the slot 28 intersects the front wall 18 to define an entrance 30 into the slot 28. The slot 28 has a pair of bounding surfaces 32 and each of the bounding surfaces 32 angles inwardly toward a center of the slot 28. Thus, the slot 28 has a trapezoidal cross section taken along a line extending through the front 18 and back 20 walls; the slot 28 is centrally positioned on the top side 26.

A plurality of religious symbols 34 is provided and a selected one of the religious symbols 34 is removably attached to the housing 16. The selected religious symbol is chosen according to religious beliefs of the deceased person. Each of the religious symbols 34 has a stem 36 and the stem 36 has a distal end 38. The distal end 38 has a foot 40 thereon and the foot 40 has a pair of lateral surfaces 42. Each of the lateral surfaces 42 angles inwardly toward a center of the stem 36 such that the foot 40 has a trapezoidal shape. The entrance 30 of the slot 28 insertably receives the foot 40 on the stem 36 of the selected religious symbol. In this way the selected religious symbol 34 is retained on the housing 16 having the selected religious symbol 34 extending upwardly from the top side 26 of the housing 16.

A pair of adhesive strips 44 is each coupled to the housing 16. Each of the adhesive strips 44 adhesively engages the front face 14 of the tombstone 12 to retain the housing 16 on the tombstone 12. Each of the adhesive strips 44 is positioned on the back wall 20 of the housing 16 and each of the adhesive strips 44 may comprise a weather resistant, permanent adhesive, such as epoxy or the like. A pair of columns 46 is each coupled to the housing 16. Each of the columns 46 is vertically oriented on a respective one of the first 22 and second 24 lateral sides of the housing 16 for enhancing an ornamental appeal of the housing 16.

A control circuit 48 is positioned within the housing 16, a display 50 is coupled to the housing 16 and the display 50 is electrically coupled to the control circuit 48. The display 50 displays indicia comprising images and text being associated with the deceased person. In this way the display 50 enhances the memorial experience for the individuals visiting the tombstone 12. The display 50 is positioned on the front wall 18 of the housing 16 and the display 50 may comprise an LED display or the like.

A transceiver 52 is positioned in the housing 16 and the transceiver 52 is electrically coupled to the control circuit 48. The transceiver 52 is in wireless electrical communication with a remote data source 54 for downloading data from the remote data source 54. The transceiver 52 may be a radio frequency transceiver 52 or the like and the transceiver 52 may employ a WPAN signal and Bluetooth communication protocols. An electronic memory 56 is positioned in the housing 16 and the electronic memory 56 is electrically coupled to the control circuit 48. The electronic memory 56 stores data comprising the images and text associated with the deceased person. The electronic memory 56 may comprise RAM, a HDD or any other type of digital data storage.

An input port 58 is coupled to the housing 16 and the input port 58 is electrically coupled to the control circuit 48. The input port 58 is electrically coupled to an external data storage unit 60 for downloading the data into the electronic memory 56. The input port 58 may be a usb port or the like. A power supply 62 is positioned in the housing 16, the power supply 62 is electrically coupled to the control circuit 48 and the power supply 62 comprises at least one battery 63. Additionally, the power supply 62 includes a plurality of solar cells 64 that are each attached to the top side 26 of the housing 16. Each of the solar cells 64 is electrically coupled to the at least one battery 63 for charging the at least one battery 63. The housing 16 and the display 50 may be integral components of the tombstone 12 such that the housing 16 and display 50 are embedded into the front face 14 of the tombstone 12. A logo 66 or other text may be printed on the front wall 18 of the housing 12.

In use, the housing 16 is positioned against the front face 14 of the tombstone 12 such that each of the adhesive strips 44 adhesively engages the front face 14. The data is downloaded into the electronic memory 56 via either the transceiver 52 or the input port 58. Thus, the display 50 displays the indicia to enhance the memorial experience for the individuals visiting the tombstone 12. Additionally, the selected religious symbol 34 may be attached to the housing 16 to express the religious beliefs of the deceased person.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tombstone display assembly being configured to display an auxiliary memorial on a tombstone, said assembly comprising:
   a tombstone for a deceased person, said tombstone having a front face;
   a housing being coupled to said tombstone, said housing being positioned on said front face such that said housing is visible to individuals visiting said tombstone;
   a plurality of religious symbols, a selected one of said religious symbols being removably attached to said housing, said selected religious symbol being chosen according to religious beliefs of the deceased person;
   a control circuit being positioned within said housing;
   a pair of adhesive strips, each of said adhesive strips being coupled to said housing, each of said adhesive strips adhesively engaging said front face of said tombstone to retain said housing on said tombstone; and
   a display being coupled to said housing, said display being electrically coupled to said control circuit, said display displaying indicia comprising images and text being associated with the deceased person wherein said display is configured to enhance the memorial experience for the individuals visiting said tombstone, said display being positioned on said front wall of said housing;
   said housing has a front wall, a back wall, a first lateral side, a second lateral side and a top side, said top side having a slot extending downwardly therein, said slot intersecting said front wall to define an entrance into said slot, said slot having a pair of bounding surfaces, each of said bounding surfaces angling inwardly toward a center of said slot such that said slot has a trapezoidal cross section taken along a line extending through said front and back walls, said slot being centrally positioned on said top side; and
   each of said adhesive strips is positioned on said back wall of said housing.

2. The assembly according to claim 1, wherein each of said religious symbols has a stem, said stem having a distal end, said distal end having a foot thereon, said foot having a pair of lateral surfaces, each of said lateral surfaces angling inwardly toward a center of said stem such that said foot has a trapezoidal shape, said entrance of said slot insertably receiving said foot on said stem of said selected religious symbol having said selected religious symbol extending upwardly from said top side of said housing.

3. The assembly according to claim 1, further comprising a pair of columns, each of said columns being coupled to said housing, each of said columns being vertically oriented on a respective one of said first and second lateral sides of said housing for enhancing an ornamental appeal of said housing.

4. The assembly according to claim 1, further comprising an electronic memory being positioned in said housing, said electronic memory being electrically coupled to said control circuit, said electronic memory storing data comprising the images and text associated with the deceased person.

5. The assembly according to claim 4, further comprising an input port being coupled to said housing, said input port being electrically coupled to said control circuit, said input port being electrically coupled to an external data storage unit for downloading the data into said electronic memory.

6. The assembly according to claim 5, further comprising a power supply being positioned in said housing, said power supply being electrically coupled to said control circuit, said power supply comprising at least one battery.

7. A tombstone display assembly being configured to display an auxiliary memorial on a tombstone, said assembly comprising:
- a tombstone for a deceased person, said tombstone having a front face;
- a housing being coupled to said tombstone, said housing being positioned on said front face such that said housing is visible to individuals visiting said tombstone, said housing having a front wall, a back wall, a first lateral side, a second lateral side and a top side, said top side having a slot extending downwardly therein, said slot intersecting said front wall to define an entrance into said slot, said slot having a pair of bounding surfaces, each of said bounding surfaces angling inwardly toward a center of said slot such that said slot has a trapezoidal cross section taken along a line extending through said front and back walls, said slot being centrally positioned on said top side;
- a plurality of religious symbols, a selected one of said religious symbols being removably attached to said housing, said selected religious symbol being chosen according to religious beliefs of the deceased person, each of said religious symbols having a stem, said stem having a distal end, said distal end having a foot thereon, said foot having a pair of lateral surfaces, each of said lateral surfaces angling inwardly toward a center of said stem such that said foot has a trapezoidal shape, said entrance of said slot insertably receiving said foot on said stem of said selected religious symbol having said selected religious symbol extending upwardly from said top side of said housing;
- a control circuit being positioned within said housing;
- a pair of adhesive strips, each of said adhesive strips being coupled to said housing, each of said adhesive strips adhesively engaging said front face of said tombstone to retain said housing on said tombstone, each of said adhesive strips being positioned on said back wall of said housing;
- a pair of columns, each of said columns being coupled to said housing, each of said columns being vertically oriented on a respective one of said first and second lateral sides of said housing for enhancing an ornamental appeal of said housing;
- a display being coupled to said housing, said display being electrically coupled to said control circuit, said display displaying indicia comprising images and text being associated with the deceased person wherein said display is configured to enhance the memorial experience for the individuals visiting said tombstone, said display being positioned on said front wall of said housing;
- an electronic memory being positioned in said housing, said electronic memory being electrically coupled to said control circuit, said electronic memory storing data comprising the images and text associated with the deceased person;
- an input port being coupled to said housing, said input port being electrically coupled to said control circuit, said input port being electrically coupled to an external data storage unit for downloading the data into said electronic memory; and
- a power supply being positioned in said housing, said power supply being electrically coupled to said control circuit, said power supply comprising at least one battery.

* * * * *